(12) United States Patent
Kobayashi et al.

(10) Patent No.: US 6,332,433 B1
(45) Date of Patent: Dec. 25, 2001

(54) GAS ENGINE OPERATED MACHINE

(75) Inventors: Tetsuya Kobayashi; Takayoshi Sugiyama; Haruo Tsusaka; Takanori Sato, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/653,533

(22) Filed: Aug. 31, 2000

(30) Foreign Application Priority Data

Sep. 3, 1999 (JP) .................................................. 11-249687

(51) Int. Cl.$^7$ ...................................................... F02B 63/00
(52) U.S. Cl. .................................................. 123/2; 123/527
(58) Field of Search ................................ 123/2, 527, 529, 123/198 E; 290/1 A

(56) References Cited

FOREIGN PATENT DOCUMENTS 64-41654    3/1989   (JP) .

*Primary Examiner*—Noah P. Kamen
(74) *Attorney, Agent, or Firm*—Arent Fox Kintner Plotkin & Kahn, PLLC

(57) ABSTRACT

A gas engine operated machine includes a machine unit that includes an engine burning a gas fuel, and a working device driven by the engine, the machine unit being surrounded by and fixed to a rigid frame formed by framing an elongated frame material, and an upper portion of the machine unit being covered with a roof, such that the operated machine is easy to handle and attractive in appearance, and it is possible to effectively avoid another object colliding against piping parts such as a gas fuel pressure regulator and the like, or rain water, dust and the like striking against the piping parts, thereby stabilizing the operation of the piping parts and enhancing the durability of the piping parts. A roof includes an upper cover bulged upwards, and a lower cover mounted to a lower surface of the upper cover, and supported on a rigid frame through vibration-damping members. A gas fuel pressure regulator, a gas shut-off valve and a connecting pipe connecting the regulator and the shut-off valve in series to each other are mounted on an upper surface of the lower cover, so that they are covered with the upper cover.

3 Claims, 9 Drawing Sheets

GAS ENGINE OPERATED MACHINE

BACKGROUND OF THE INVENTION

1. Field of the Invention

The present invention relates to a gas engine operated machine including a machine unit which includes an engine burning a gas fuel, and a working device such as a generator driven by the engine, the machine unit being surrounded by and fixed to a rigid frame formed by framing an elongated frame material, and an upper portion of the machine unit being covered with a roof.

2. Description of the Prior Art

An engine operated machine, e.g., an engine power-generating machine utilized as a general-purpose power source machine driven outdoors and using a gas engine adapted to bum a gas fuel such as natural gas, LPG gas and the like in respect of running cost and in respect of consideration for the environment, has begun to come into wide use in recent years (for example, see Japanese Utility Model Application Laid-open No. 1-41654).

In such type of gas engine operated machine, it is common that gas piping parts such as a gas fuel pressure regulator, gas shut-off valves and the like are fixed directly on a frame member of the above rigid frame in order to support the gas piping parts stably.

PROBLEM TO BE SOLVED BY THE INVENTION

In the gas engine operated machine, however, in order to stabilize the operation of the gas piping parts, it is necessary to design the gas piping parts so that another object cannot strike against the gas piping parts from the outside. In addition, when the gas engine operated machine is used outdoors, it is necessary to take durability against rainwater, dust and the like into consideration.

In a structure in which the gas piping parts are merely fixed directly to the frame member as in the prior art, there is a problem that shock and a engine vibration acting on the frame member are transmitted to the gas piping parts.

SUMMARY OF THE INVENTION

The present invention has been proposed with the above circumstances in view, and it is an object of the present invention to provide a gas engine operated machine, wherein the above problem can be solved.

To achieve the above object, according to the present invention, there is provided a gas engine operated machine, including a machine unit which can include an engine burning a gas fuel, and a working device driven by the engine, the machine unit being surrounded by and fixed to a rigid frame formed by framing an elongated frame material, and an upper portion of the machine unit being covered with a roof, wherein the roof is comprised of an upper cover bulged upwards, and a lower cover mounted on a lower surface of the upper cover, and the roof can be supported on the rigid frame through vibration-damping members, and the machine further can include a gas fuel pressure regulator for regulating the pressure of a gas fuel supplied to the engine, a gas shut-off valve for stopping the supplying of the gas fuel to the engine, and a connecting pipe which connects the gas fuel pressure regulator and the gas shut-off valve in series to each other, the gas fuel pressure regulator, the gas shut-off valve and the connecting pipe being mounted on an upper surface of the lower cover in such a manner that they are covered with the upper cover.

With the above feature, the gas fuel pressure regulator and the gas shut-off valve, including the connecting pipe connecting the regulator and the valve, can be handled as a single piping unit and hence, a gas fuel system can be concentrated on the lower cover and its layout can be made easily using a minimum length of pipes. Moreover, the piping unit can be accommodated and protected between the upper and lower covers of the roof. Therefore, the product is attractive in appearance and also it is possible to effectively avoid another object colliding against the piping parts, and rainwater, dust and the like striking against the piping parts. Even if shock and engine vibration are applied to the rigid frame around the machine unit, the transmission of the shock and vibration to the piping parts can be inhibited effectively by buffering effects provided by the vibration-damping member.

In embodiments of the present invention, in addition to the above-discussed feature, the gas fuel pressure regulator and the gas shut-off valve can be integrally connected and fixed to each other through the connecting pipe on the lower cover. With this feature, the gas fuel pressure regulator and the gas shut-off valves are supported stably on the lower cover in a state in which they have been collectively integrally coupled to each other by the durable connecting pipe made of a metal. Moreover, the operation of mounting the piping unit to the lower cover is further simplified.

Also, in embodiments of the present invention, in addition to above-discussed features, the lower cover can be disposed above a cylinder of the engine, and the gas shut-off valve, the gas fuel pressure regulator and the connecting pipe can be arranged such that a gas inlet of the shut-off valve and a gas outlet of the regulator are located on the same side of the machine unit. With this feature, in the maintenance or the like, the operation of connecting the gas pipes can be easily carried out in a concentrated manner on the same side of the machine unit, and the distance of connection between the gas fuel pressure regulator and the engine (a mixer) can be shortened.

BRIEF DESCRIPTION OF THE DRAWINGS

An exemplary mode for carrying out the present invention will now be described by way of an embodiment of the present invention shown in the accompanying drawings.

In the accompanying drawings.

DETAILED DESCRIPTION OF THE PREFERRED EMBODIMENT

Figure 1:
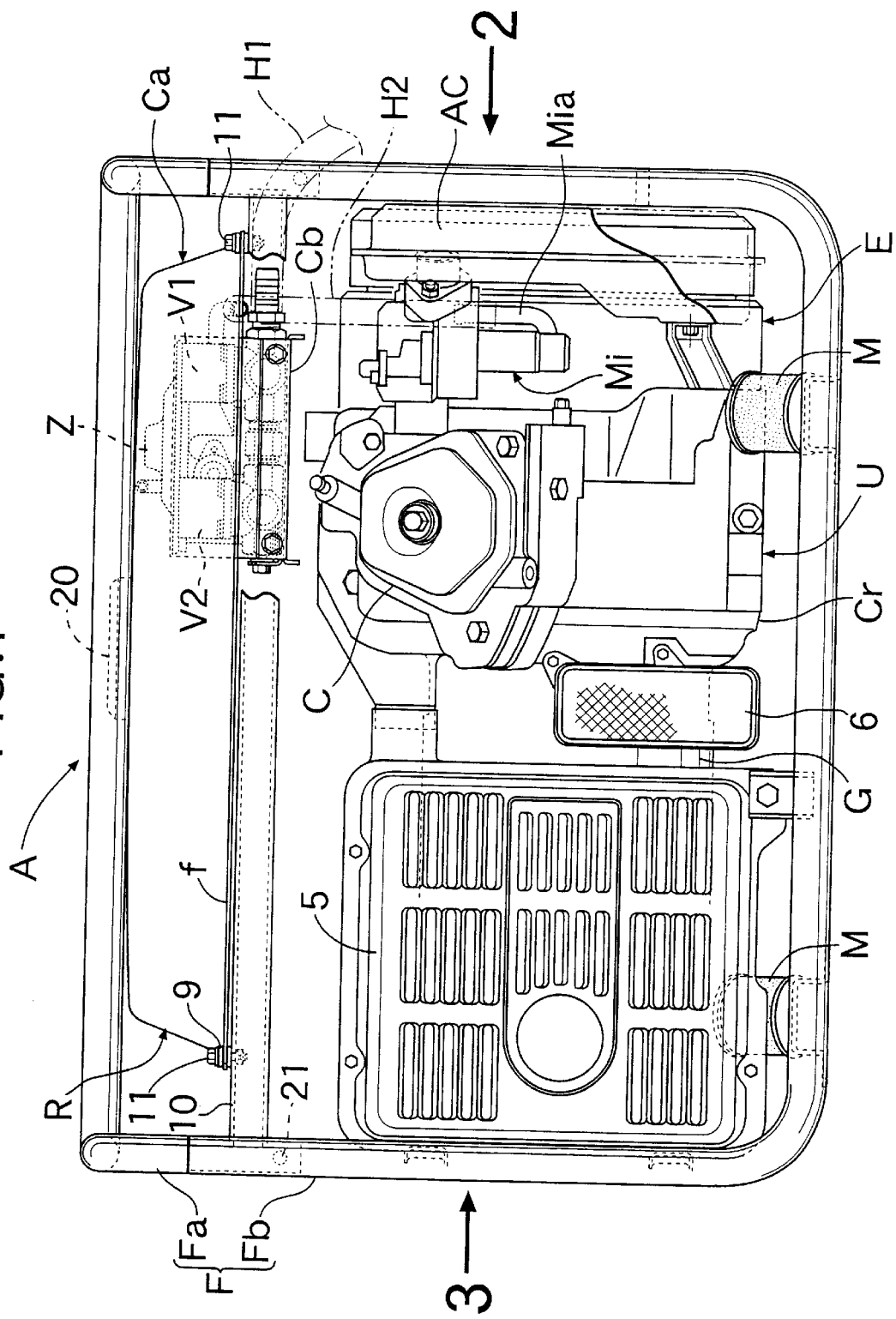
FIG. 1 is a front view showing an embodiment of a gas engine operated machine according to the present invention.
Figure 2:
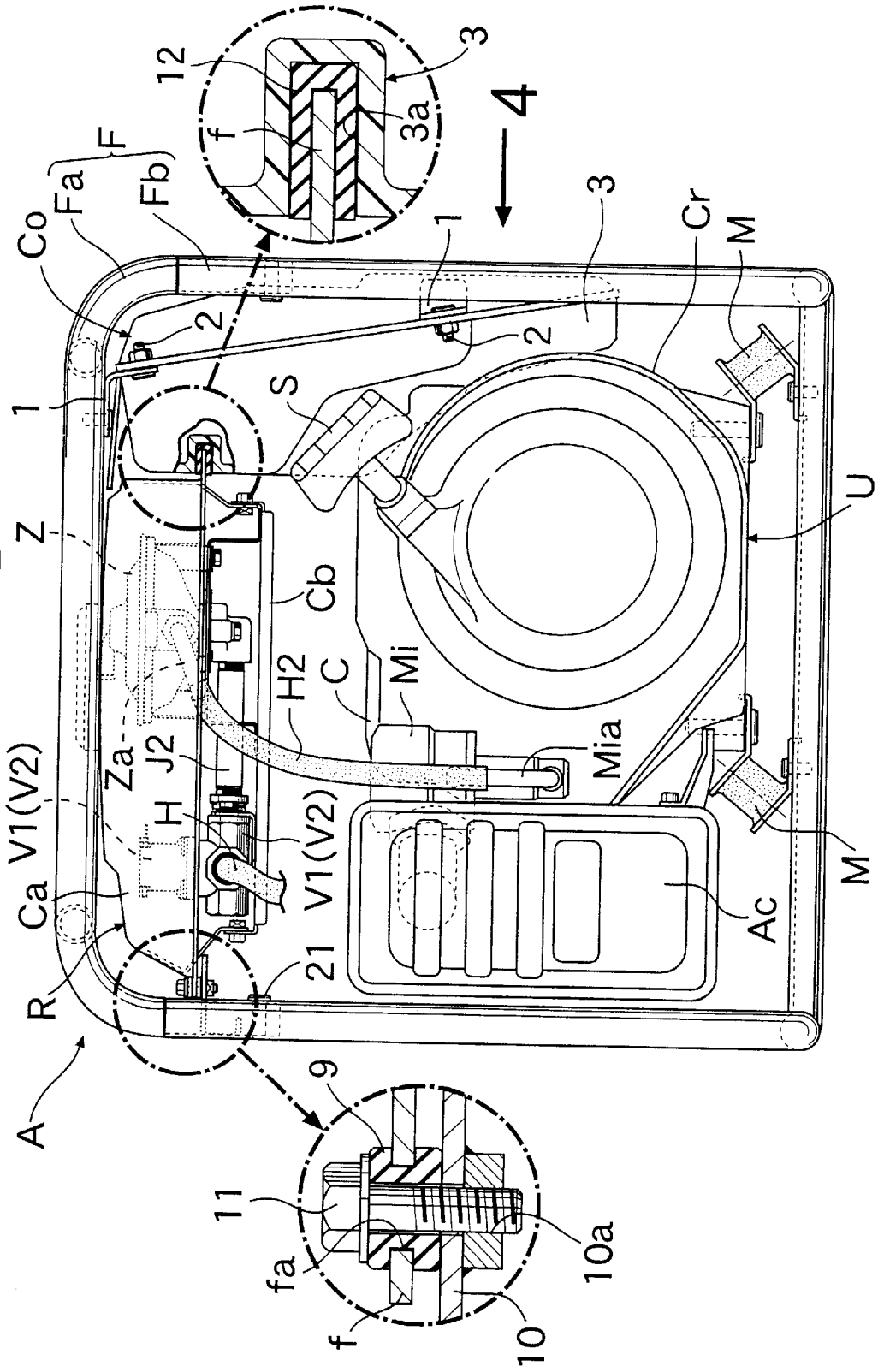
FIG. 2 is a side view taken in the direction of an arrow 2 in FIG. 1.
Figure 3:
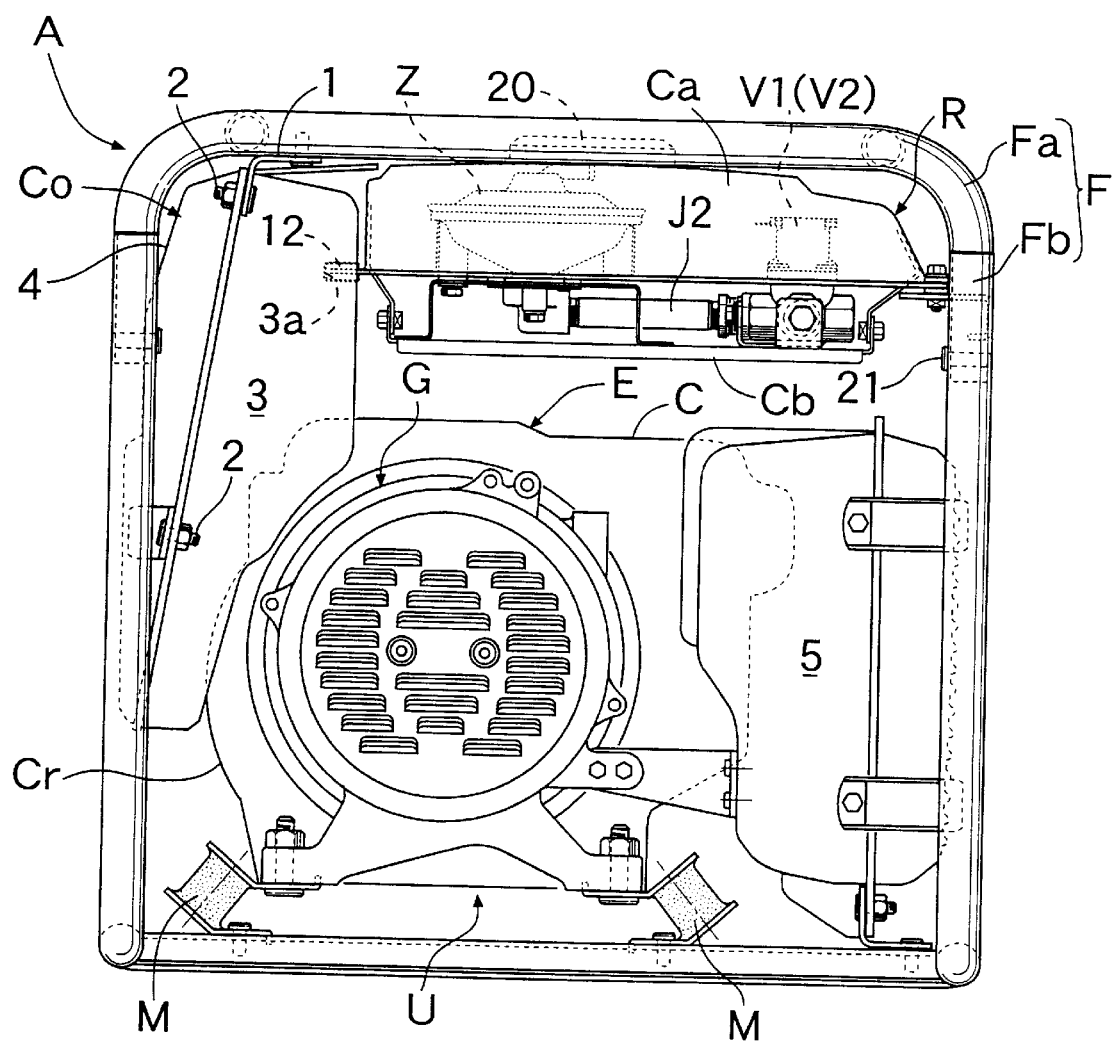
FIG. 3 is a side view taken in the direction of an arrow 3 in FIG. 1.
Figure 4:
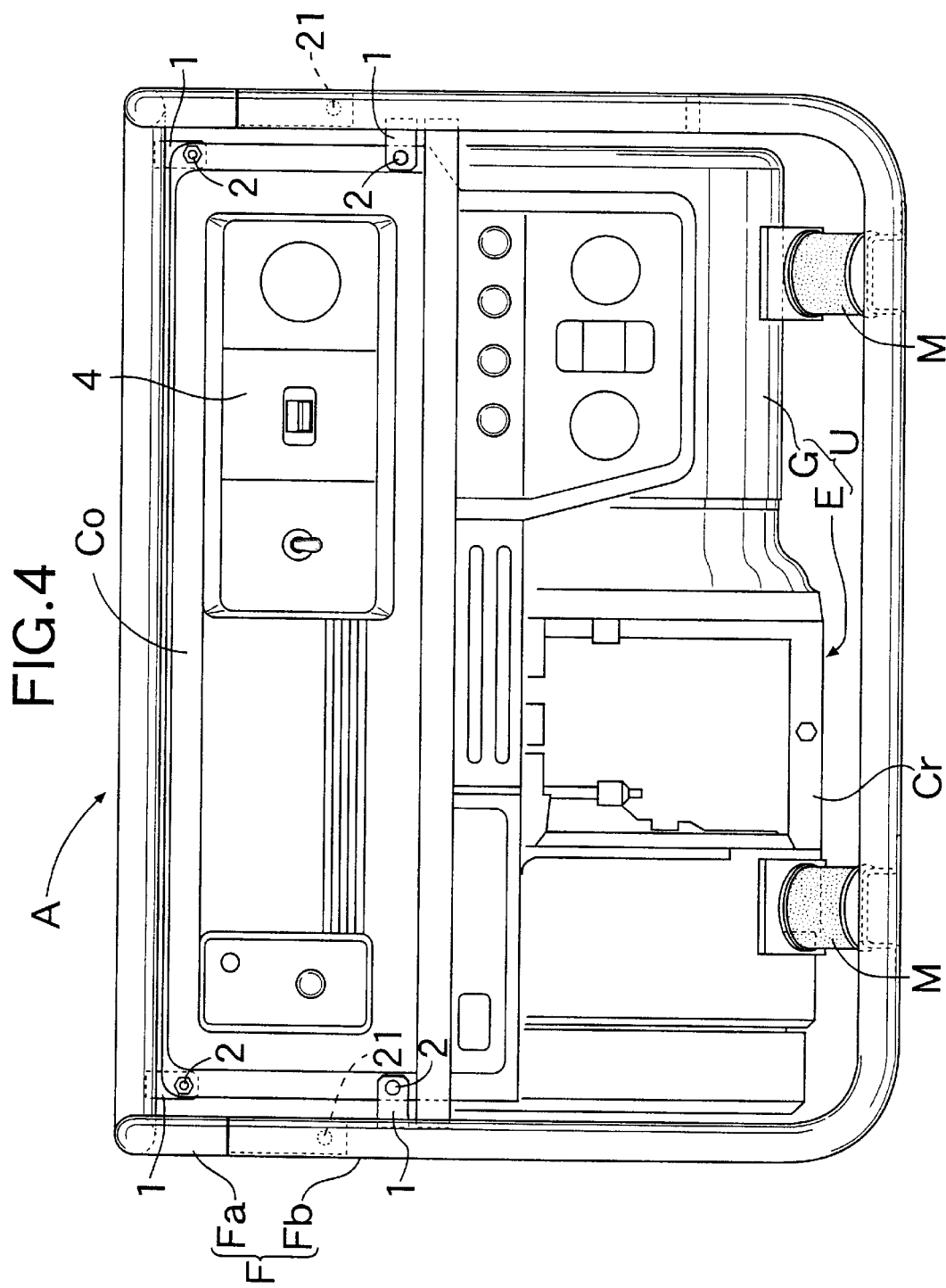
FIG. 4 is a back view showing the embodiment (a view taken in the direction of an arrow 4 in FIG. 2)
Figure 5:
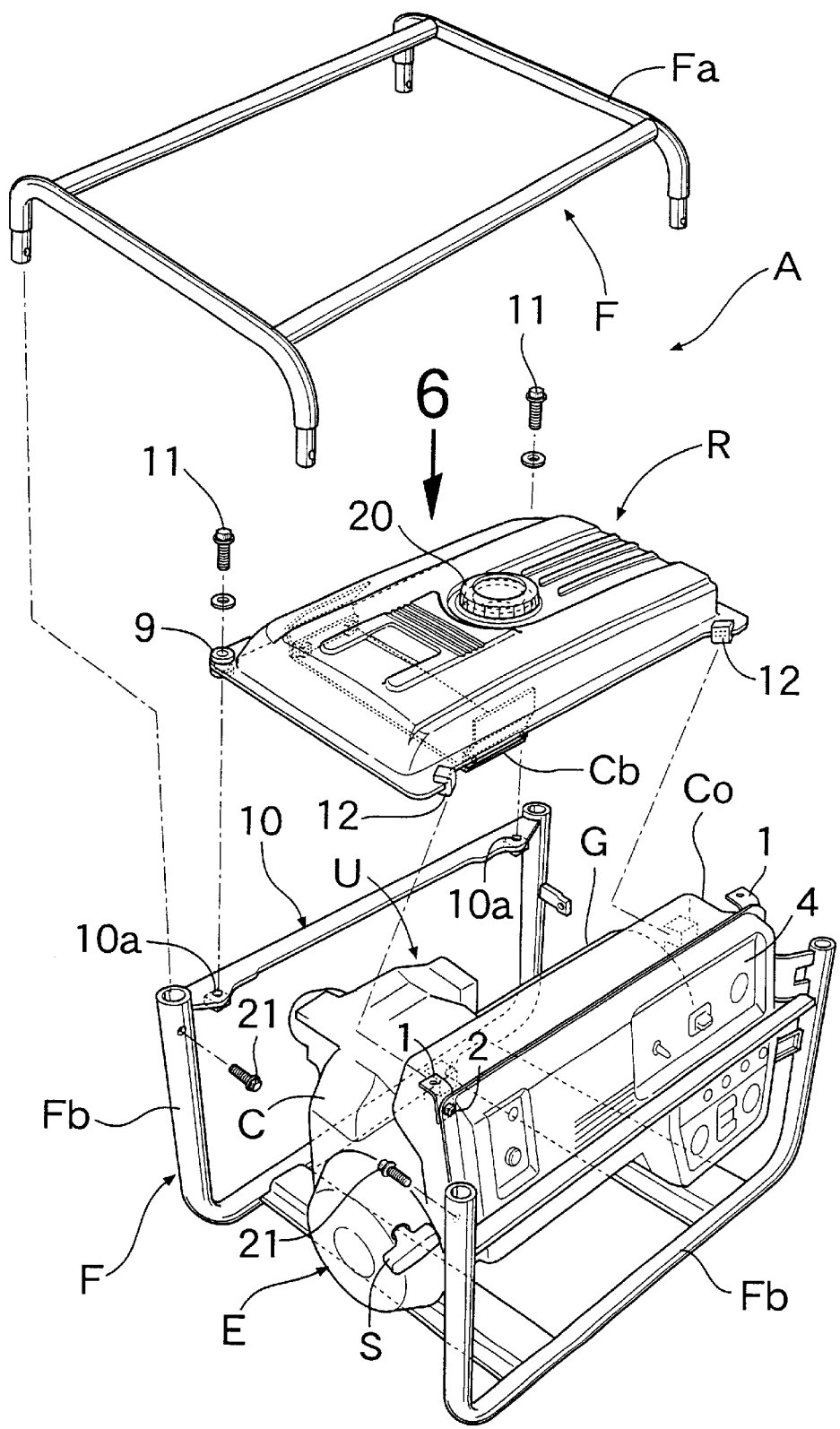
FIG. 5 is an exploded perspective view showing the embodiment, taken from the back side.
Figure 6:
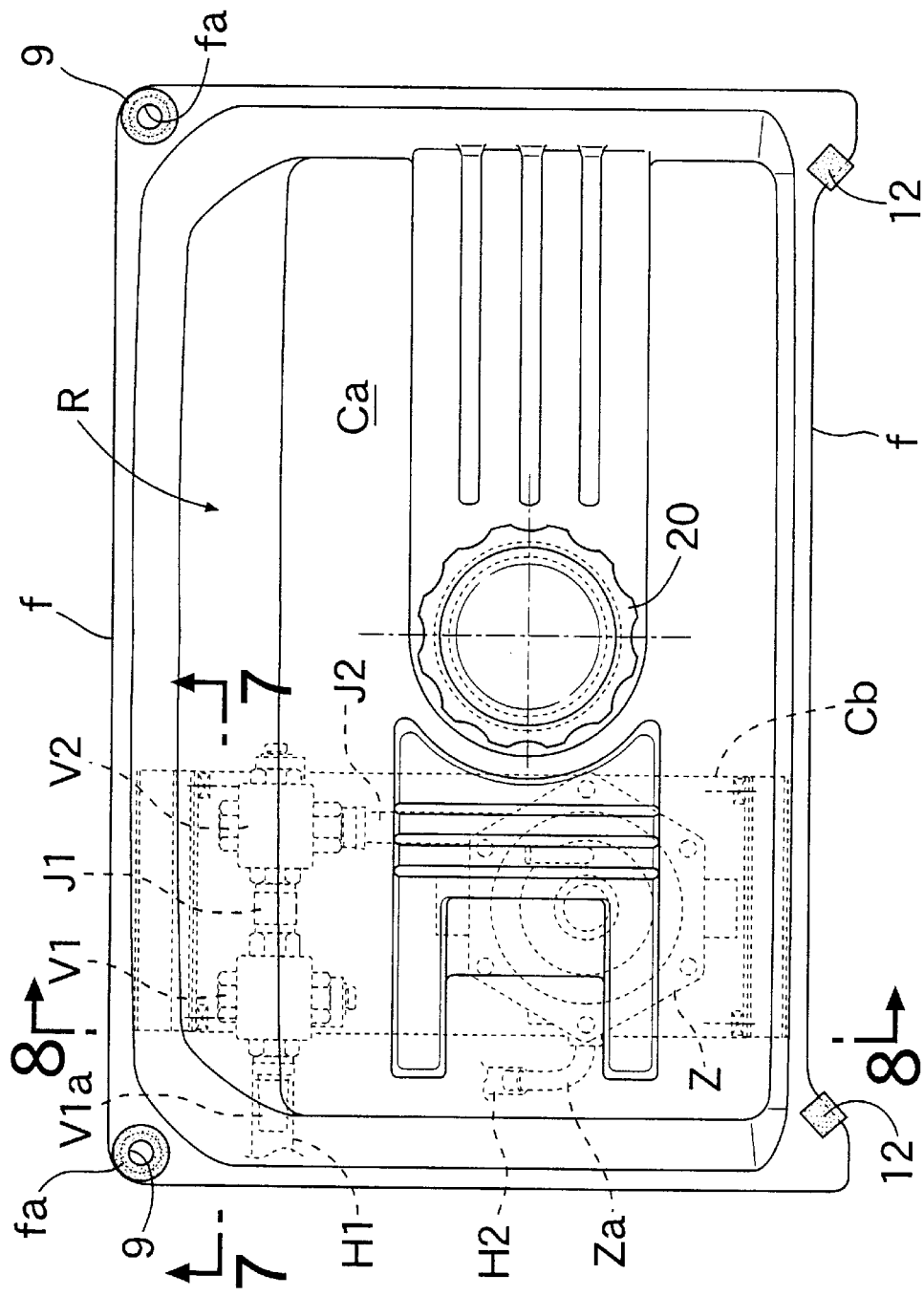
FIG. 6 is a plane view taken in the direction of an arrow 6 in FIG. 5.

Referring first to FIGS. 1 to 6, an engine power generating machine A as an embodiment of a gas engine operated machine according to the invention includes a machine unit U which is surrounded by a rigid frame F and which comprises an engine E burning a gas fuel such as natural gas, LPG gas and the like, and a generator G as a working device driven by the engine E. The rigid frame F is constructed by framing an elongated pipe-shaped frame material into a substantially rectangular parallelepiped-shape, and is divided into an upper frame member Fa having a substantially square shape in the illustrated embodiment, and a lower frame member Fb detachably coupled at its four corners to the upper frame member by fixing means such as screw members 21. As used in this specification, the term "longitudinal direction" means a direction in which the engine E and the generator G are arranged, i.e., a longitudinal direction of the machine unit U, and the term "lateral direction" means a direction traversing the machine unit U.

The lower frame member Fb constitutes a main portion of the rigid frame F, and the machine unit U is detachably fixed to a bottom portion of the lower frame member Fb with a plurality of rubber mounts M interposed therebetween.

A controller Co is detachably fixed to laterally one side of the lower frame member Fb through a plurality of stays 1 and the screw member 2 to cover laterally one side of the machine unit U. The controller Co is similar to a controller conventionally mounted to a normal engine generating machine, and includes a housing 3 which is formed from a synthetic resin plate into a box relatively flat in a lateral direction of the machine unit U. An outer wall of the housing 3 is a control panel 4 in which an AC plug socket, a pilot lamp, a breaker, an output voltmeter, an adjuster, a DC terminal, an earth terminal, switches and the like are appropriately placed.

A cylinder C is connected to the engine E and extends laterally and upwards from one side of a crankcase Cr of the engine E, and the generator G is connected to a rear portion of the crankcase Cr. An exhaust muffler 5 is disposed on one of the left and right of the generator G and connected to an exhaust pipe of the engine E, and an air cleaner Ac is disposed in front of the engine E for supplying clean air to a mixer Mi connected to an intake port in the engine E. Both of the muffler 5 and the air cleaner Ac are detachably fixed to the rigid frame F (the lower frame member Fb). Reference character 6 in FIG. 1 is a port for introducing cooling-air into the generator G.

Figure 7:
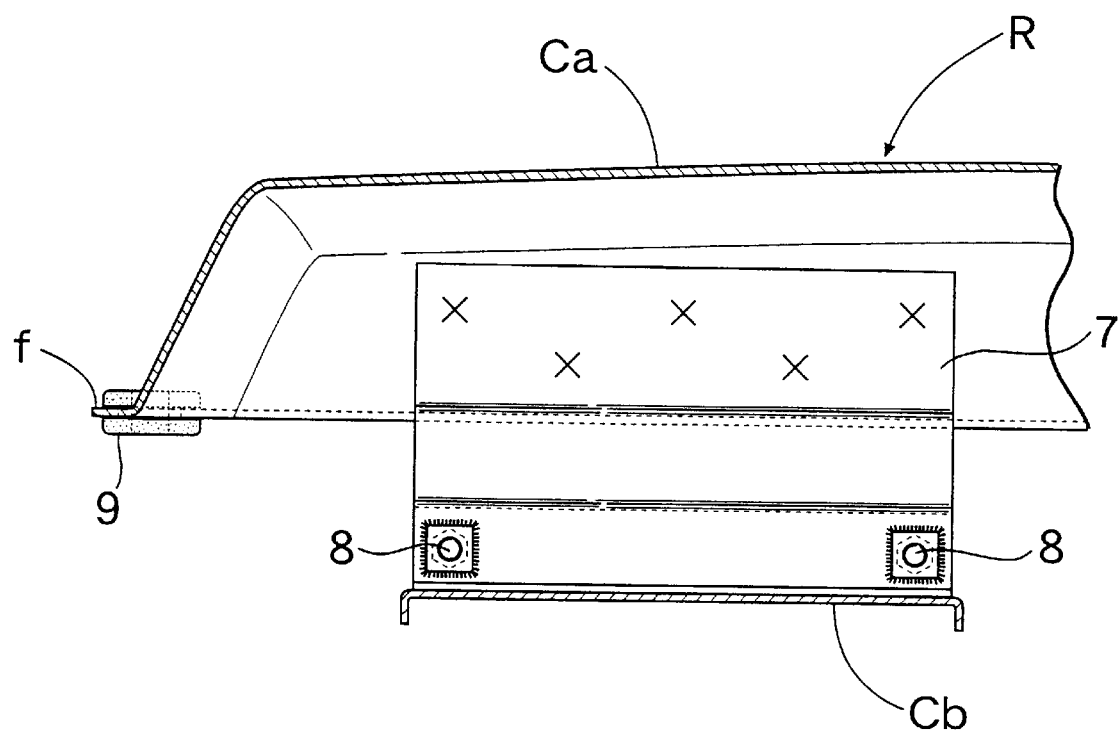
FIG. 7 is an enlarged sectional view taken along a line 7—7 in FIG. 6.
Figure 8:
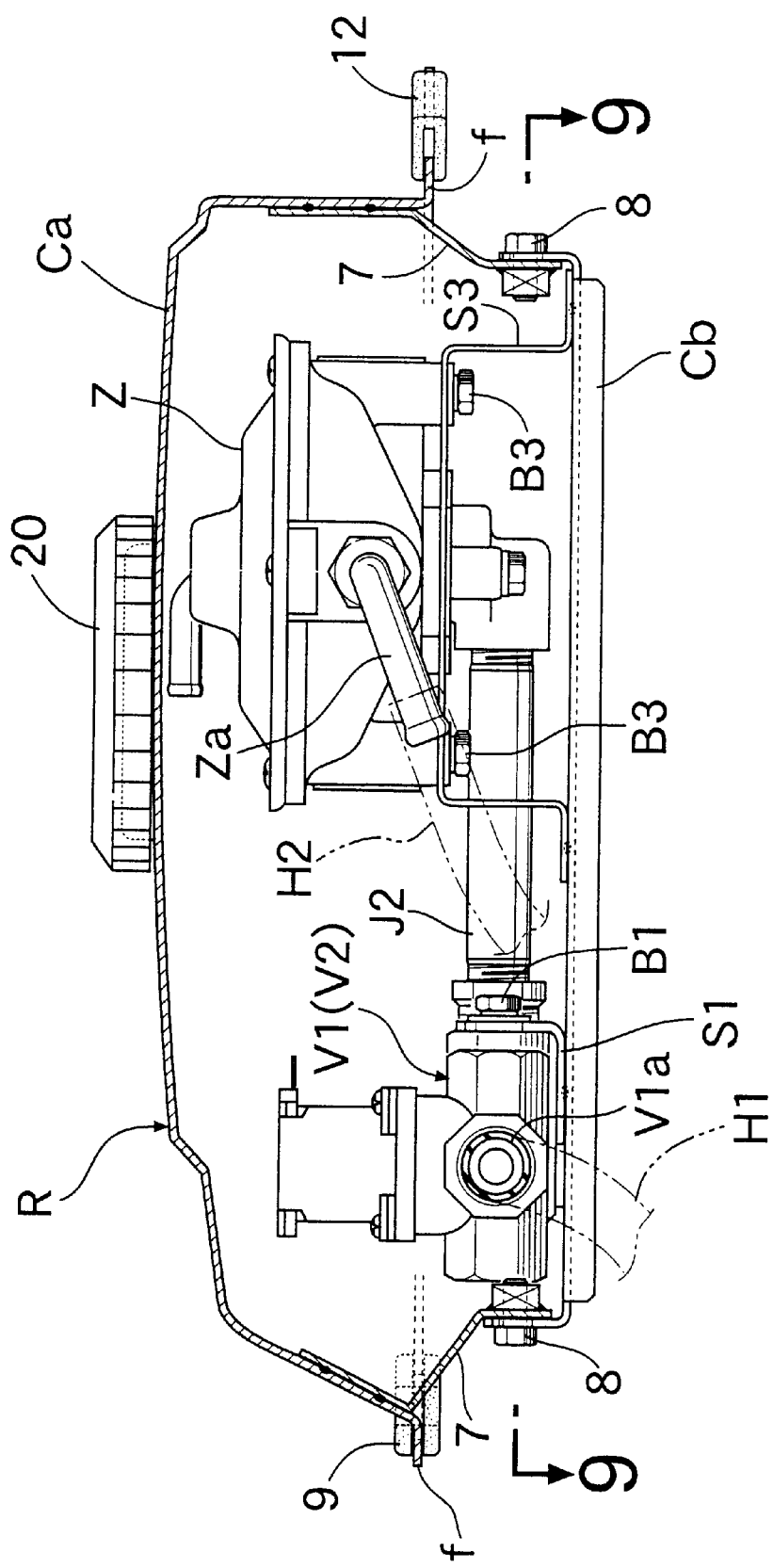
FIG. 8 is an enlarged sectional view taken along a line 8—8 in FIG. 6.

An upper portion of the machine unit U is covered with a wide upper portion of the controller Co and a roof R adjacent to the wide upper portion. The roof R is comprised of an upper cover Ca which is formed into a upward-bulged flat dish-shape, as best shown in FIGS. 7 and 8 and which extends substantially over front and rear ends of the machine unit U, and a lower cover Cb mounted on a lower surface of the upper cover Ca. The lower cover Cb extends to laterally traverse the upper cover Ca above the cylinder C of the engine E. The lower cover Cb is detachably connected through a screw member 8 to a pair of left and right stays 7, which are secured at their opposite ends to laterally opposite ends of an inner surface of the upper cover Ca, respectively and which extend downwards, whereby the lower cover Cb is laterally bridged over the lower surface of the upper cover Ca.

A substantially horizontal outward-facing flange f is integrally formed over the entire periphery at an opening edge of the lower end of the upper cover Ca, and a pair of front and rear mounting holes fa (FIG. 2) are defined in the flange f on a laterally one side thereof. A support frame 10 is integrally formed at the upper end of a laterally one-side portion of the lower frame member Fb such that the flange f is placed on the support frame 10. A pair of front and rear threaded holes 10a are provided in the support frame 10 in correspondence to the mounting holes fa. Therefore, the laterally one side (the flange f) of the upper cover Ca is resiliently supported on the lower frame member Fb (the support frame 10) through a grommet 9 serving as a vibration-damping member.

The flange f on the laterally other side is withdrawably inserted into a mounting recess 3a defined in the housing 3 of the controller Co. A pair of rubber pieces 12 each formed into a U-shape in cross section are secured to front and rear portions of the flange f on the laterally other side corresponding to the mounting recess 3a. Therefore, the laterally other side of the flange f is resiliently supported in the mounting recess 3a through a rubber piece 12 serving as a vibration-damping member.

Figure 9:
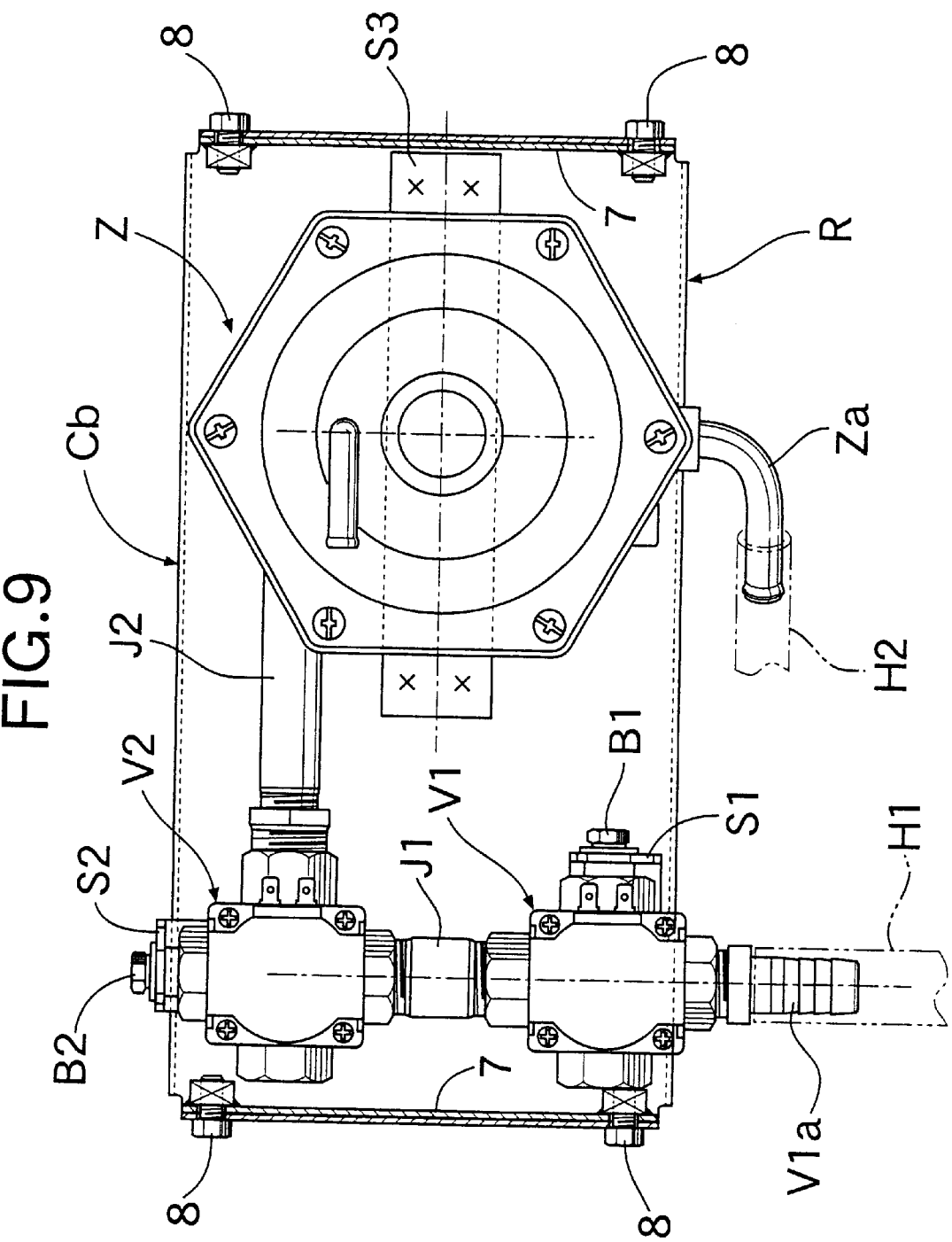
FIG. 9 is a sectional view taken along a line 9—9 in FIG. 8.

Referring also to FIG. 9, a gas piping unit is mounted on an upper surface of the lower cover Cb in such a manner that it is covered with the upper cover Ca. The gas piping unit comprises a pair of electromagnetic gas shut-off valves V1 and V2 for automatically stopping the supplying of a gas fuel to the engine E during stoppage of the engine E, a gas fuel pressure regulator Z for regulating the pressure of the gas fuel supplied to the engine E in a reducing manner to supply the gas fuel to the mixer Mi, and connecting pipes J1 and J2 which connect the gas fuel pressure regulator Z and the gas shut-off valves V1 and V2 in series to each other. The gas shut-off valves V1 and V2 are connected to a lead wire extending from the controller Co, so that the opening and closing of valves V1 and V2 are controlled in response to a control signal output from the controller Co.

Particularly, in the illustrated embodiment, the gas shut-off valves V1 and V2 connected in series to each other through the first connecting pipe J1 made of a metal are arranged on laterally one side of the lower cover Ca, and the gas fuel pressure regulator Z connected to an outlet of the second gas shut-off valve V2 through the second connecting pipe J2 made of a metal is disposed on the laterally other side of the cover Ca. The gas shut-off valves V1 and V2 and the gas fuel pressure regulator Z are detachably coupled to stays S1, S2 and S3 secured on the lower cover Cb with screw members B1, B2 and B3. In the illustrated embodiment, the gas shut-off valves V1 and V2 and the gas fuel pressure regulator Z can be supported stably on the lower cover Cb in a state in which they have been coupled collectively and integrally by the durable connecting pipes J1 and J2 made of metal. Moreover, it is easy to handle such gas piping unit, and the operation of mounting the piping unit to the lower cover Cb is very simple.

Moreover, in the illustrated embodiment, the pair of gas shut-off valves V1 and V2 and the gas fuel pressure regulator Z as well as the connecting pipes J1 and J2 connecting the valve V1 and V2 and the regulator Z to each other, which constitute the gas piping unit, are arranged so as to describe a loop as a whole, and a gas inlet V1a of the first gas shut-off valve V1 and a gas outlet Za of the gas fuel pressure regulator Z are arranged so that they are located on the same side of the machine unit U (on the front side in the illustrated embodiment). Thus, in the maintenance or the like, the operation of connecting the gas pipes H1 and H2 can be easily carried out in a concentrated manner on the same side of the machine unit U, and the distance of connection between the gas fuel pressure regulator Z and the engine E (i.e., the mixer Mi) can be shortened.

The operation of the above-described embodiment of this invention will be described below. In operating the engine power-generating machine A having the above-described structure and placed outdoors, the gas inlet V1a of the first gas shut-off valve V1 and a gas supply source (not shown) such as a gas tank or the like with a gas fuel such as natural gas, LPG gas and the like stored therein are connected in advance to each other by the first gas pipe H1, and a gas outlet Za of the gas fuel pressure regulator Z and a gas inlet Mia of the mixer Mi located immediately below the lower cover Cb are connected in advance to each other by the second gas pipe H2.

When an operating portion of the control panel 4 of the controller Co is now operated for switching-over to "an operational state", the gas shut-off valves V1 and V2 are opened. When a starter knob is pulled in this state to start the engine E, the gas fuel is reduced in pressure by the gas fuel pressure regulator Z and then supplied to the mixer Mi, where it is mixed with air supplied from the air cleaner Ac. The resulting mixture is fed to a combustion chamber in the engine E. Thus, the operation of the engine E is started, and the generator G operatively associated with the engine E starts the generation of power.

In the engine power-generating machine A, the roof R covering the upper portion of the machine unit is comprised of the upper cover Ca bulged upwards, and the lower cover Cb mounted to the lower surface of the upper cover Ca, and the gas fuel pressure regulator Z, the gas shut-off valves V1 and V2 and the connecting pipes J1 and J2 between the regulator Z and the valves V1 and V2 are mounted on the upper surface of the lower cover Cb in such a manner that they are covered with the upper cover Ca. Therefore, the gas fuel pressure regulator Z and the gas shut-off valves V1 and V2, including the connecting pipes J1 and J2 connecting the regulator Z and the valves V1 and V2, can be handled as the single piping unit and hence, a gas fuel system can be concentrated on the lower cover Cb and its layout can be made easily at a minimum length. Moreover, the piping unit can be accommodated while assuring good appearance and protected between the upper and lower covers Ca and Cb of the roof R. Therefore, the product is attractive appearance, but also it is possible to effectively avoid another member colliding against the piping parts Z, V1, V2, J1 and J2, and rain water, dust and the like striking against the piping parts Z, V1, V2, J1 and J2, leading to an enhancement in durability of the piping parts Z, V1, V2, J1 and J2.

Even if shock caused by collision against another member and vibration of the engine E are applied to the rigid frame F surrounding the machine unit U, the transmission of the shock and the vibration to the piping parts Z, V1, V2, J1 and J2 can be inhibited effectively by buffering effects provided by the grommet 9 serving as the vibration-damping member and by the rubber piece 12.

In the illustrated embodiment, components (e.g., a machine unit U, a rigid frame F, an exhaust muffler 5, an air cleaner Ac and the like) for a gasoline engine power-generating machine driven by an engine using gasoline as fuel are diverted to the utmost to constitute the gas engine power-generating machine A. In this case, the upper cover Ca of the roof R is constituted by diverting an upper half of a fuel tank mounted in the gasoline engine power-generating machine, and a suitable cap 20 is mounted to an oil supply port of the fuel tank in place of an oil supply cap. A placing space for the fuel tank is utilized, for placing spaces for the lower cover Cb and the gas piping parts Z, V1 and V2 on the lower cover Cb. Further, the mixer Mi for mixing the air supplied from the air cleaner Ac with the gas supplied from the gas fuel pressure regulator Z takes the place of a carburetor of the gasoline engine power-generating machine, but can be mounted by utilizing a carburetor placing space. By diverting the main parts for the gasoline engine in the above manner, the gas engine power-generating machine A can be produced at a low cost.

Of course, the part of the gas engine power-generating machine, e.g., the upper cover Ca may be designed and produced as an exclusive part without diversion of the part of such a gasoline engine power-generating machine.

Although one embodiment of the present invention has been described, it will be understood that the present invention is not limited to the above-described embodiment, and various other embodiments and modifications may be made within the scope of the claimed invention. For example, the generator G is illustrated as the working device in the embodiment, but according to the present invention, the generator G may be carried on another working device driven by the engine E. The roof R is supported on the rigid frame F through the rubber pieces 12 serving as the vibration-damping members with the controller Co interposed between the roof R and the rigid frame F in the embodiment, but the roof R may be supported directly on the rigid frame F without interposition of the controller Co.

As discussed above, according to embodiments of the present invention, the roof covering the upper portion of the machine unit comprising the engine and the working device includes the upper cover bulged upwards, and the lower cover mounted on the lower surface of the upper cover. The gas fuel pressure regulator, the gas shut-off valves and the connecting pipes between the regulator and the valves are mounted on the upper surface of the lower cover in such a manner that they are covered with the upper cover. Therefore, the gas fuel pressure regulator and the gas shut-off valves, including the connecting pipes connecting the regulator and the valves, can be handled as a single piping unit, and it is easy to carry out the operation of mounting them, but also the gas fuel system can be concentrated on the lower cover and its layout can be made easily at a minimum length. Moreover, the piping unit can be accommodated while assuring good appearance and protected between the upper and lower covers of the roof. Therefore, the engine operated machine is attractive in appearance, and moreover, it is possible to effectively avoid another object colliding against the piping parts and rain water, dust and the like striking against the piping parts. This can contribute to the stabilization of the operation of the piping parts and an enhancement in durability of the piping parts. Further, the roof is supported on the rigid frame around the machine unit through the vibration-damping members and hence, even if shock and engine vibration are applied to the frame member of the rigid frame, they can be effectively prevented from being transmitted to the piping parts by the buffering effect provided by the vibration-damping members. Therefore, influence exerted to the piping parts by the shock and the vibration can be suppressed to the minimum.

According to embodiments of the present invention, the gas fuel pressure regulator and the gas shut-off valves can be integrally connected and fixed to each other through the connected pipes made of metal on the lower cover. Therefore, the gas fuel pressure regulator and the gas shut-off valves can be supported stably on the lower cover in a state in which they have been collectively integrally coupled to each other by the durable connecting pipes made of a metal. Moreover, the operation of mounting the piping unit to the lower cover is further simplified.

According to embodiments of the present invention, the lower cover can be disposed above the cylinder of the engine, and the gas shut-off valves, the gas fuel pressure regulator and the connecting pipes can be arranged, so that the gas inlet of the shut-off valve and the gas outlet of the regulator are located on the same side of the machine unit. Therefore, in the maintenance or the like, the operation of connecting the gas pipes can be easily carried out collectively on the same side of the machine unit, leading to a corresponding enhancement in operating efficiency, and the distance of connection between the gas fuel pressure regulator and the engine (a mixer) can be shortened to the utmost.

What is claimed is:

1. A gas engine operated machine, comprising a machine unit which is comprised of an engine burning a gas fuel, and a working device driven by said engine, said machine unit being surrounded by and fixed to a rigid frame formed by framing an elongated frame material, and an upper portion of said machine unit being covered with a roof, wherein said roof is comprised of an upper cover bulged upwards, and a lower cover mounted on a lower surface of said upper cover, and is supported on the rigid frame through vibration-damping members, and said machine further comprises a gas fuel pressure regulator for regulating the pressure of a gas fuel supplied to said engine, a gas shut-off valve for stopping the supplying of the gas fuel to said engine, and a connecting pipe which connects said gas fuel pressure regulator and said gas shut-off valve in series to each other, said gas fuel pressure regulator, said gas shut-off valve and said connecting pipe being mounted on an upper surface of said lower cover in such a manner that they are covered with said upper cover.

2. The gas engine operated machine of claim 1, wherein said gas fuel pressure regulator and said gas shut-off valve are integrally connected and fixed to each other through said connecting pipe on said lower cover.

3. The gas engine operated machine of claim 1, wherein said lower cover is disposed above a cylinder of said engine, and said gas shut-off valve, said gas fuel pressure regulator and said connecting pipe are arranged on said lower cover, so that a gas inlet of said shut-off valve and a gas outlet of said regulator are located on a same side of said machine unit.

* * * * *